(No Model.) 7 Sheets—Sheet 3.
J. RADY.
WIRE NETTING MACHINE.

No. 503,356. Patented Aug. 15, 1893.

Fig. 3.

WITNESSES:

INVENTOR
John Rady
BY
ATTORNEY

(No Model.) 7 Sheets—Sheet 4.
J. RADY.
WIRE NETTING MACHINE.

No. 503,356. Patented Aug. 15, 1893.

WITNESSES:
J. F. Finch.
A. S. Meloy.

INVENTOR
John Rady
BY F. W. Smith Jr.
ATTORNEY

UNITED STATES PATENT OFFICE.

JOHN RADY, OF GEORGETOWN, CONNECTICUT.

WIRE-NETTING MACHINE.

SPECIFICATION forming part of Letters Patent No. 503,356, dated August 15, 1893.

Application filed October 22, 1892. Serial No. 449,685. (No model.)

*To all whom it may concern:*

Be it known that I, JOHN RADY, a citizen of the United States, residing at Georgetown, in the county of Fairfield and State of Connecticut, have invented certain new and useful Improvements in Machines for Making Wire-Netting; and I do hereby declare the following to be a full, clear, and exact description of the invention, such as will enable others skilled in the art to which it appertains to make and use the same.

My invention relates to certain new and useful improvements in machines for making wire netting, and has for its object to greatly simplify such machines and to make them more durable and less likely to get out of order.

In the accompanying drawings.

Similar numbers of reference denote like parts in the several figures of the drawings.

Machines of this description comprise bobbins from which the wires are drawn preparatory to being twisted together and spread to form the mesh, and sets of divided gears capable of an axial rotation around a common center, whereby the wires are twisted together, said gears being also carried bodily by reciprocatory slides in opposite directions, after their rotary movement, for the purpose of spreading the wires to form the mesh.

My invention does not pertain to the broad idea of twisting the wires and then spreading them by means of the instrumentalities above specified, for this constitutes a method commonly followed in the manufacture of wire netting.

The chief aim of my invention is, first, to simplify the mechanism for rotating the gears by using a single set of rack-bars instead of a double set; second, to simplify the mechanism for imparting the proper movements to the rack-bars and slides; third, to provide a very simple means for forming the selvage at the sides of the netting; fourth, to provide a superior bobbin whereby the wire may be drawn or fed out without any danger of kinking or breaking, and fifth, to provide a stop-motion whose operation shall be dependent upon the accidental breakage of the wire and the consequent failure to form the proper mesh in the netting. I will not, therefore, describe in detail any parts of the machine shown except those with which my invention is intimately connected.

1 is any suitable frame, 2 the driving pulley shaft journaled in a bracket 3 extending from the frame, 4 the driving pulley. 5, 6, are shafts journaled in said frame and having meshing gears 7, 8, and 9, 10, are sprocket wheels on the shafts 2, 5, which wheels are connected by sprocket-chain 11, whereby motion is communicated to the shaft 6. On this shaft 6 is mounted the usual feed-roll 12 which draws the wire from the bobbins, and 13 is the drum around which the netting is wound as fast as it comes from the feed roll.

14 is a vertical shaft journaled in cross-beams 15, 16, of the frame, and 17, 18, are meshing beveled gears on the shafts 2, 14, respectively, whereby motion is communicated to the shaft 14.

The divided gears, the slides in which they are journaled, the rack-bar which revolves the gears and the mechanisms by which the proper movements are imparted to said rack-bar and slides, are all duplicated, one complete set of the same being arranged and operated at the upper ends of the bobbins, while the other complete set of the same is similarly arranged and operated at the lower ends of the bobbins, and I will therefore describe but one of these sets and will denote by like numbers of reference the corresponding parts of both sets.

19 is a vertical rock-shaft journaled in the frame 1, and 20 a crank extending from said shaft.

Figures 4, 14:
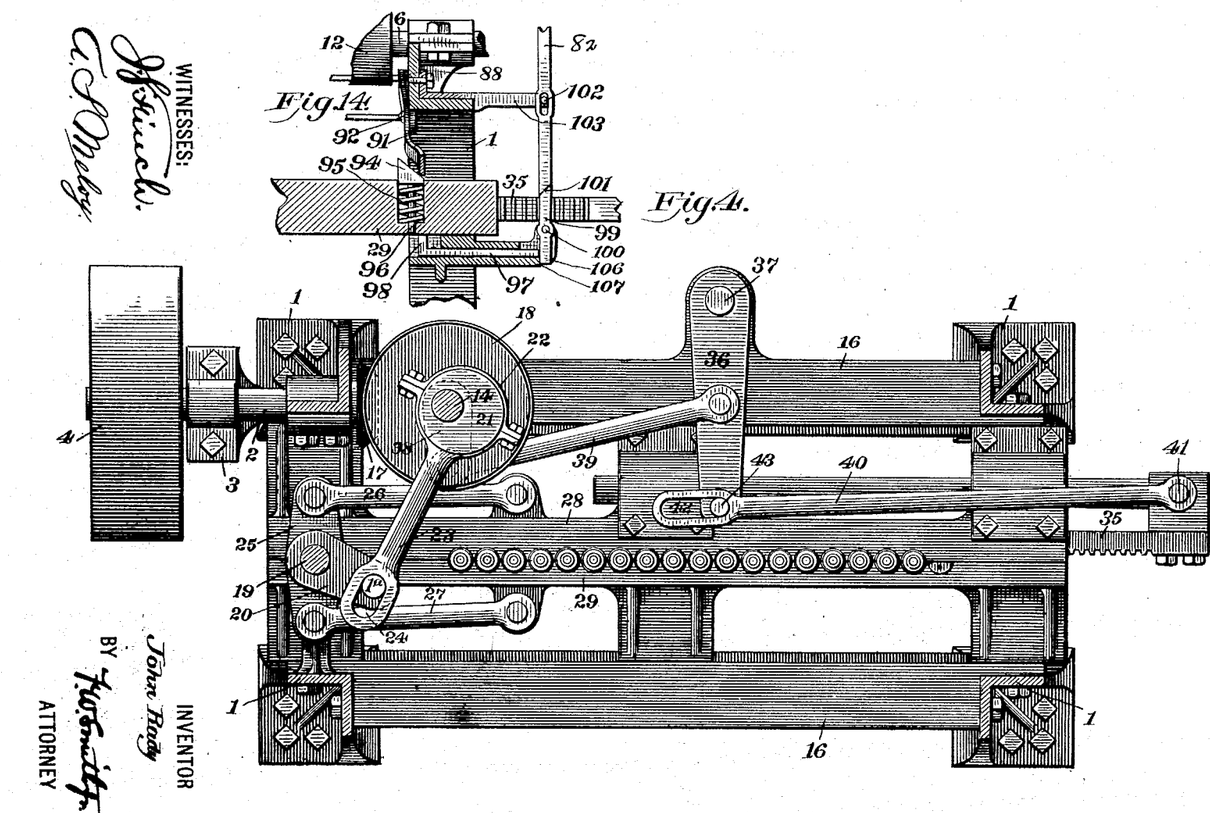
Fig. 4, a similar view taken on the line $b, b,$ of Fig. 1.
Fig. 14, a detail section on the line $d, d,$ of Fig. 3, illustrating a portion of the stop-motion mechanism.

21 is an eccentric on the shaft 14, 22 a strap around said eccentric, and 23 a lever extending from said strap and having at its end an elongated slot 24, into which extends a stud 1ª from the crank 20, whereby the rotation of said eccentric will effect the rocking movement of the shaft 19. (See Fig. 4.)

Figures 7, 8, 9, 10, 11, 12, 13:
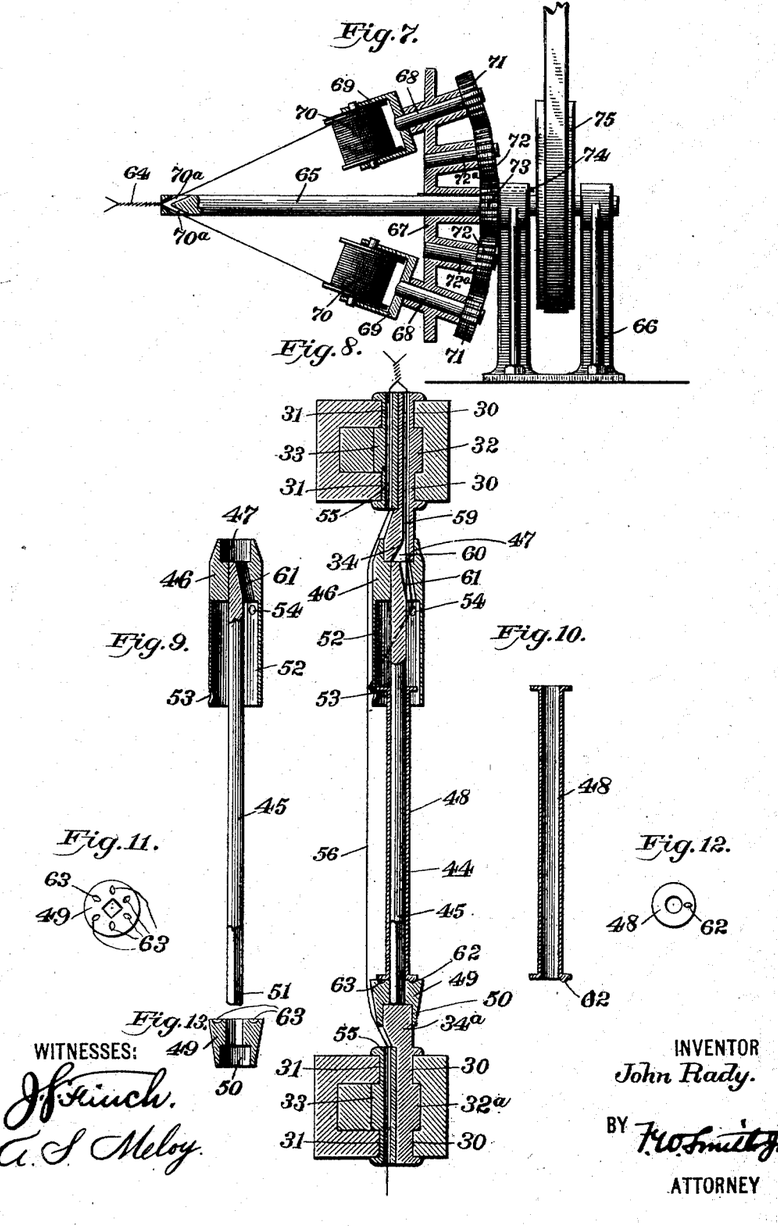
Fig. 7, is a sectional elevation of one of the selvage twisting devices.
Fig. 8, a detail sectional elevation showing in cross-section the slides and divided gears for forming the mesh of the netting and rock-bars for rotating the divided gears to form the twists, and also the bobbin and its immediate connection with the divided gears.
Figs. 9, 10 and 13 are detail vertical sectional elevations of the bobbin.
Fig. 11, a detail plan view illustrating the depressions in the face of the block shown in section in Fig. 13.
Fig. 12 is an end view of the spool shown in Fig. 10 illustrating the teat which engages the depressions in the face of the block shown in Fig. 11.

25 is a rocker-bar rigid on the shaft 19, and 26, 27, are pitmen which connect the ends of said bar with the respective slides 28, 29, whereby the latter are thrown in opposite directions when the shaft 19 is rocked. These slides are guided in suitable ways in the cross-beam 16 (the duplicate slides being in the beam 15) and have in their adjacent edges bearings within which are journaled the short shafts 30, 31, of the complementary gear sections 32, 33. The tail 34 of one of these gears extends within the end of the bobbin-holder, as shown at Fig. 8, for the purpose presently explained.

Within the slide 28 is a guided and reciprocatory rack-bar 35 which is in mesh with the gear sections 32.

36 is a lever pivoted at 37 at its heel end to the frame 1. 38 is a crank on the shaft 14, and 39 is a pitman pivoted at its ends to said crank and lever.

40 is a connecting bar one end of which is pivoted at 41 to the end of the rack-bar, while the other end has therein an elongated slot 42 into which projects a stud 43 from the end of the lever 36.

From the foregoing it will be readily understood that the rotation of the shaft 14 will effect the reciprocation of the slides and rack-bar, but it is necessary that the rack-bar should have no independent sliding movement during its movements of the slides. The timing of the eccentric 21 and the crank 38 is such that during the movement of the slides the stud 43 will travel idly throughout the slot 42, and therefore the rack-bar will have no independent movement at that time; but as soon as the slides have become stationary, the stud 43, will have reached the end of the slot 42, and the continued revolution of the crank 38 will then cause the rack-bar to slide and revolve the divided gears. Also, during the operation of the rack-bar the stud 1ª will travel idly throughout the slot 24 and consequently the slides will be stationary. In forming the twists in the wires a greater length is added to the netting than is added by spreading the wires to form the mesh, and heretofore the speed of the feed-roll 12 has been uniform, the consequence being that a proper tension is not maintained on the netting, and the twisted portions are apt to be irregular and kinked.

My invention contemplates imparting to the feed-roll a variable speed which latter shall be governed by the draft of wire from the bobbins, and to this end I make the sprocket-wheels 9, 10, of a general ovoidal shape and mount them eccentrically on the shafts 2, 5, the timing of the action of said sprockets through their diameters and through their eccentricities being such that a good tension is always maintained on the netting by the roll 12 as fast as such netting is formed.

Heretofore in machines of this description it has been well nigh impossible to manufacture wire netting of hard wire, owing to the imperfect construction of the bobbin or such analogous device. My invention contemplates an improved bobbin and bobbin-holder upon which either hard wire or annealed wire may be used with equal advantage.

Figure 2:
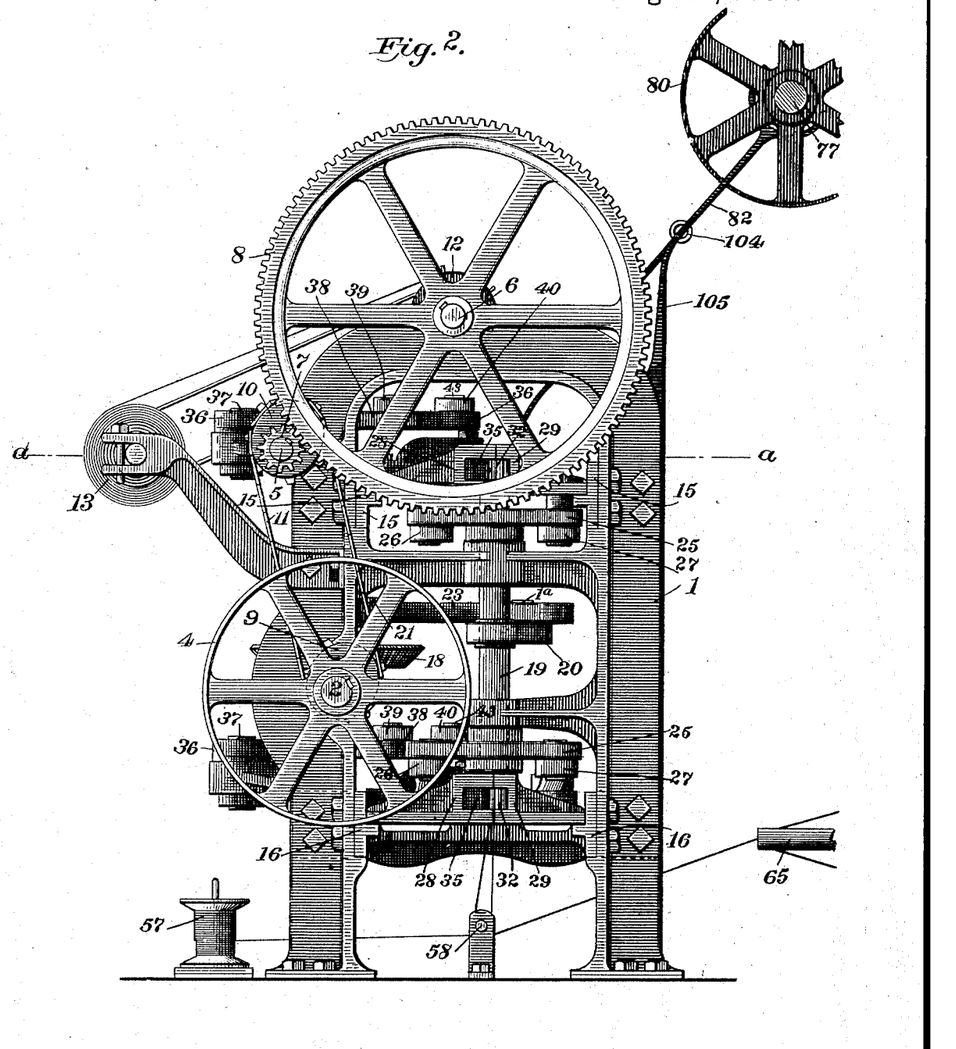
Fig. 2, an end elevation.
Figure 3:
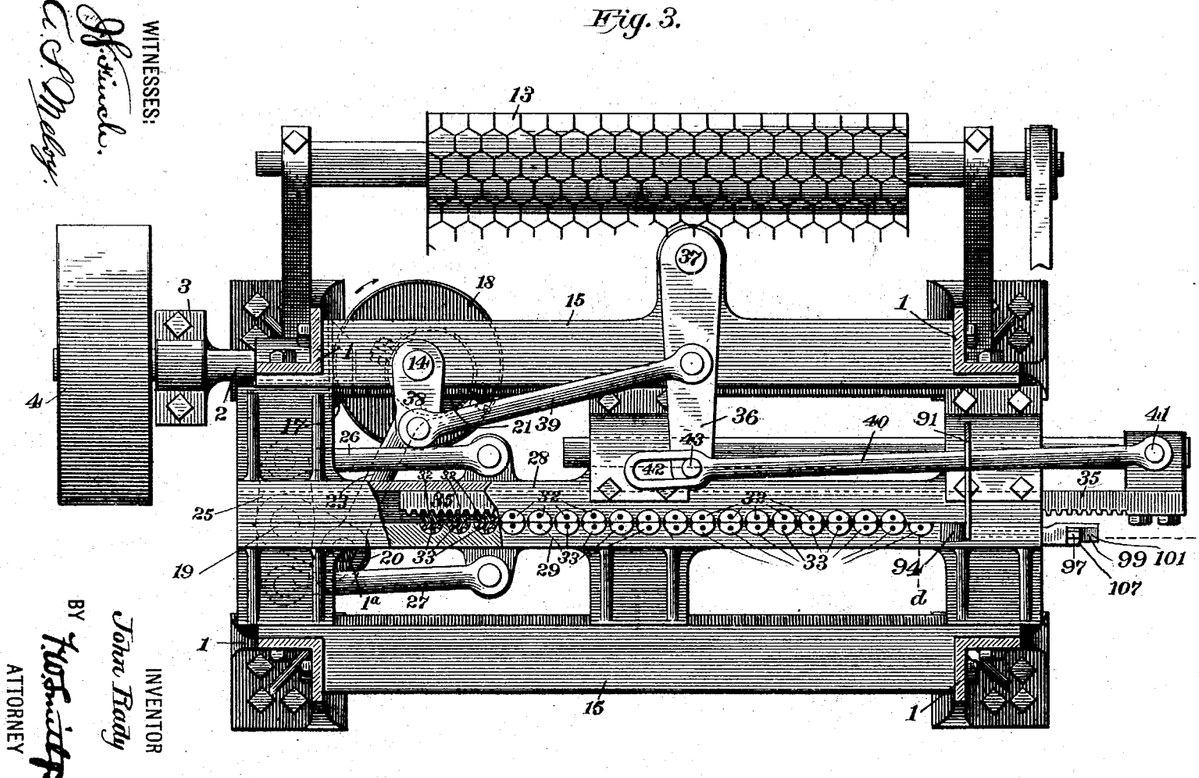
Fig. 3, a horizontal section on the line $a, a$, of Fig. 2.

Referring to Figs. 8, 9 and 10, 44 is the bobbin holder which comprises a spindle 45 rigidly secured within a head 46. 47 is an annular recess in the head 46 within which the tail 34 of the divided gear section 32 loosely extends. 48 is a bobbin loosely mounted on the spindle 45. 49 is a block upon which said bobbin in normal position rests. 50 is an annular recess in this block within which the tail 34ª of the divided gear section 32ª of the lower series of divided gears loosely extends. The spindle 45 is squared upon the end as shown at 51, and extends through a similarly squared opening in the block 49. From the foregoing it will be observed that the bobbin-holders, being loosely journaled between the two series of divided gears, are not necessarily revolved when said gears are rotated. Depending from the head 46 is a hood 52, and 53, 54, are holes in said hood through which the weft wire is passed for a purpose presently explained. 55 are perforations extending through both the upper and lower series of the sections 33 of the divided gears. 56 is the woof wire which is drawn from any suitable source, as a spool or reel 57 (Figs. 2 and 5) and passed under a roll 58 and thence through the perforations 55 in the divided gear sections 33 of both the lower and upper series to the point of twisting, as shown in Fig. 8. 59 is a perforation extending through the section 32 and tail 34 of the upper series of divided gears and having a flared mouth as seen at 60. The perforation in the divided gear section 32 communicates with a perforation 61 through the head of the bobbin-holder. 62 is a teat on the lower extremity of the bobbin 48 which engages a series of depressions 63 in the adjacent face of the block 49 for a purpose which will presently appear.

The manner of threading and assembling and the operation of my improved bobbin and bobbin-holder are as follows: The bobbin 48 with a mass of wire coiled thereon is placed on the spindle 45; the end of the wire is then threaded through the holes 53, 54, in the hood and thence passed through the perforation 61 in the head 46 and finally through the perforation 59 in the divided gear section 32 to the twisting point. The block 49 is then placed over the squared end of the spindle and said block and bobbin are then pushed up a sufficient distance on said spindle to permit the bobbin holder to be inserted between the tails 34, 34$^a$, of the divided gears 32, 32$^a$, with the tail 34 of the divided gear 32 within the recess 47 in the head of the bobbin-holder. The block 49 is then lowered until the tail 34$^a$ of the divided gear section 32$^a$ extends within the annular recess 50 in said block. The device is now in the position for the wire to be drawn from the bobbin. As the wire is drawn from the bobbin said bobbin will be elevated upon the spindle 45 so that the teat 62 formed on the lower extremity of said bobbin will be raised clear of the depressions 63 so that said bobbin will be free to revolve and reel off the wire upon the same; but when the draft upon the wire is removed said bobbin will descend to its normal position, shown in Fig. 8, and the teat 62 will engage one of the depressions 63 to prevent the further rotation of said bobbin so that when hard wire is being used to form the netting, the coils of said wire cannot by its spring action uncoil itself from the spool and become twisted and tangled. Whenever this occurs kinks are formed in the wire and the draft and tension upon said wire are sufficient to break the same while in this condition before it arrives at the twisting point to form the mesh in the netting. It will be observed that by reason of the location of the hole 53 in the hood the wire is never drawn over or against the end of the bobbin, but that the draft upon said wire is always in a direct line from said hole to the coil from which said wire is being drawn. This is another point of importance in the construction of my bobbin, for in the instance of the wire being drawn against and over the end of the bobbin, the grinding action of the end of said bobbin caused by the rotation of the same while the wire is being drawn off, together with the friction exerted by the draft upon the wire is not infrequently sufficient to break the same.
The perforation 59 in the divided gear section 32 being eccentric with respect to the center of rotation of said gear section, and the same being true of the perforation 61 in the head of the bobbin-holder, and as each is capable of movement independent of the other, I have flared the mouth of the perforation 59 so that the wire from the bobbin may at all times be drawn off with facility and without danger of breaking. The selvage wires 64 which are substituted in place of the single woof wire at the extreme edges of the wire netting are composed of several wires twisted together in lieu of a single heavy wire and the devices for twisting these wires and the manner of operating the same I will now describe. Of course there are two separate devices for making the selvage, one at either side of the machine, but inasmuch as both of these devices are constructed precisely alike, I shall proceed to describe but one of them, the numerals of reference designating the corresponding parts in both devices.

Figure 5:
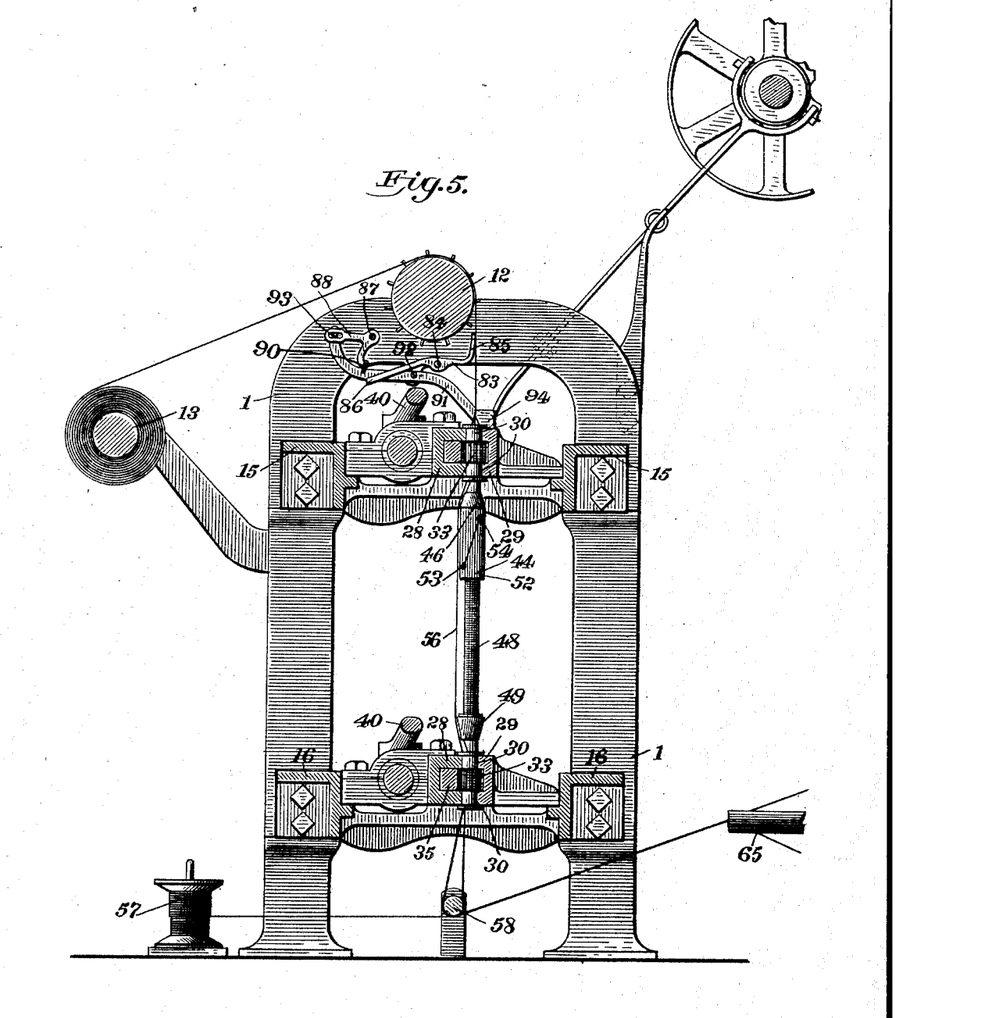
Fig. 5, a vertical cross-section on the line $c, c,$ of Fig. 1.
Figure 6:
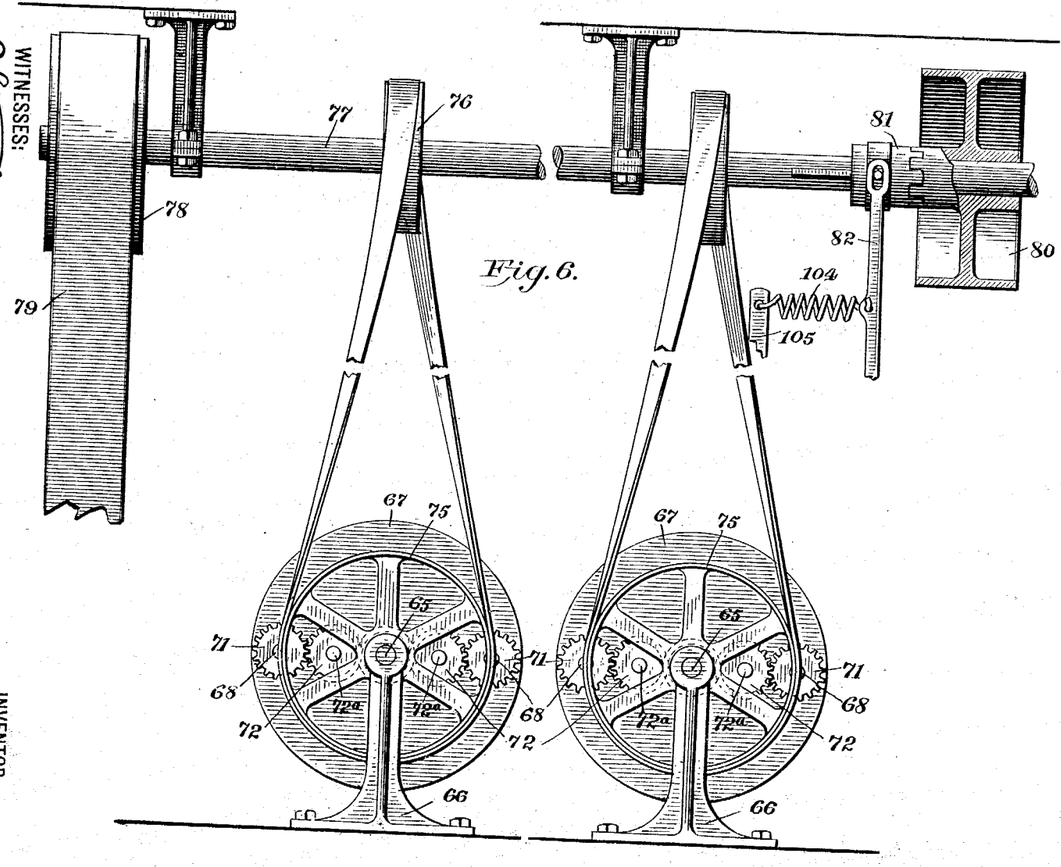
Fig. 6, a broken elevation partly in section showing the power-pulley which is journaled loosely upon a counter-shaft together with the clutch-mechanism with which the stop-motion lever is connected. The devices for twisting the wires for the selvages are also shown belted up to this counter-shaft.

Referring to Figs. 6 and 7, 65 is a shaft journaled in brackets 66 bolted to the floor within convenient distance of the bobbins 44. 67 is a disk keyed upon said shaft and 68 are short shafts which pass through bearings in said disk. Upon the inner ends of these shafts 68 are rigidly secured spool-holders 69 within which are held loosely the spools of wire 70. The wires from the spools 70 are led through perforations 70$^a$ in the shaft 65 out at the end of said shaft and passed under the roll 58 and thence through the divided gear sections 33 to the point where the wires are twisted to form the mesh. 71 are spur gears keyed upon the outer ends of these short shafts 68 and meshing with idle gears 72 loosely mounted on the spindles 72$^a$ secured upon said disk. The idle gears 72 in turn mesh with the gear 73 loosely mounted on the shaft 65 but locked as against rotary movement by means of the pin 74 which passes through the bracket 66 (Fig. 7) within a hole (not shown) in said gear 73. 75 is a pulley keyed on the shaft 65 and belted up to a pulley 76 keyed on the counter-shaft 77. As the wire is drawn off from the spools 70 the shaft 65 and the disk keyed thereon will be rotated by means of the pulley 75 belted up to the pulley 76 on the counter-shaft 77 from which motion is transmitted to the several parts of the machine. The selvage wire being passed around the roll 58 (Fig. 5) said roll will serve to hold said wire as against rotation, so that it will be readily understood that as the shaft 65 and disk keyed thereon are rotated, the several wires which are being fed from the spools on said disk through the perforations in the end of said shaft will be twisted around each other between the end of said shaft 65 and the roll 58. In twisting these wires around each other as they are drawn through the perforations 70$^a$ in the end of the shaft 65 to form the selvage, there is a tendency to form a twist in each single wire as it leaves the spool 70 and before it has passed through the perforations 70$^a$ in the end of said shaft 65. In other words, the tendency is to twist the wire upon itself between the spool and the end of the shaft. The twisting of the wire between the spool and the end of the shaft is not infrequently sufficient to cause said wire to break, and this is especially true of wire which has not been annealed. This disadvantage is entirely overcome in my present improvement, for as the shaft and disk keyed thereon are rotated a rotary movement is imparted to the spools 70 through the train of spur gears 71, 72, 73, which serves to unwind the twist that would otherwise be formed in these wires between the points designated. The counter-shaft 77 has keyed thereon a pulley 78 which is belted to the driving pulley 4 by a belt 79, said belt being shown broken away in Figs. 1 and 6. This counter-shaft 77 constitutes the drive or power-shaft of the entire machine. Loosely mounted on the counter-shaft 77 is the power-pulley 80 adapted to be engaged and disengaged by a clutch 81 splined on said counter-shaft. 82 is a spring actuated clutch lever for throwing said clutch 81 into and out of engagement with the power-pulley.

The stop-motion hereinbefore mentioned whose operation is dependent upon the accidental breakage of one or more of the wires and the consequent failure to form the mesh in the netting I will now proceed to describe.

Figure 1:
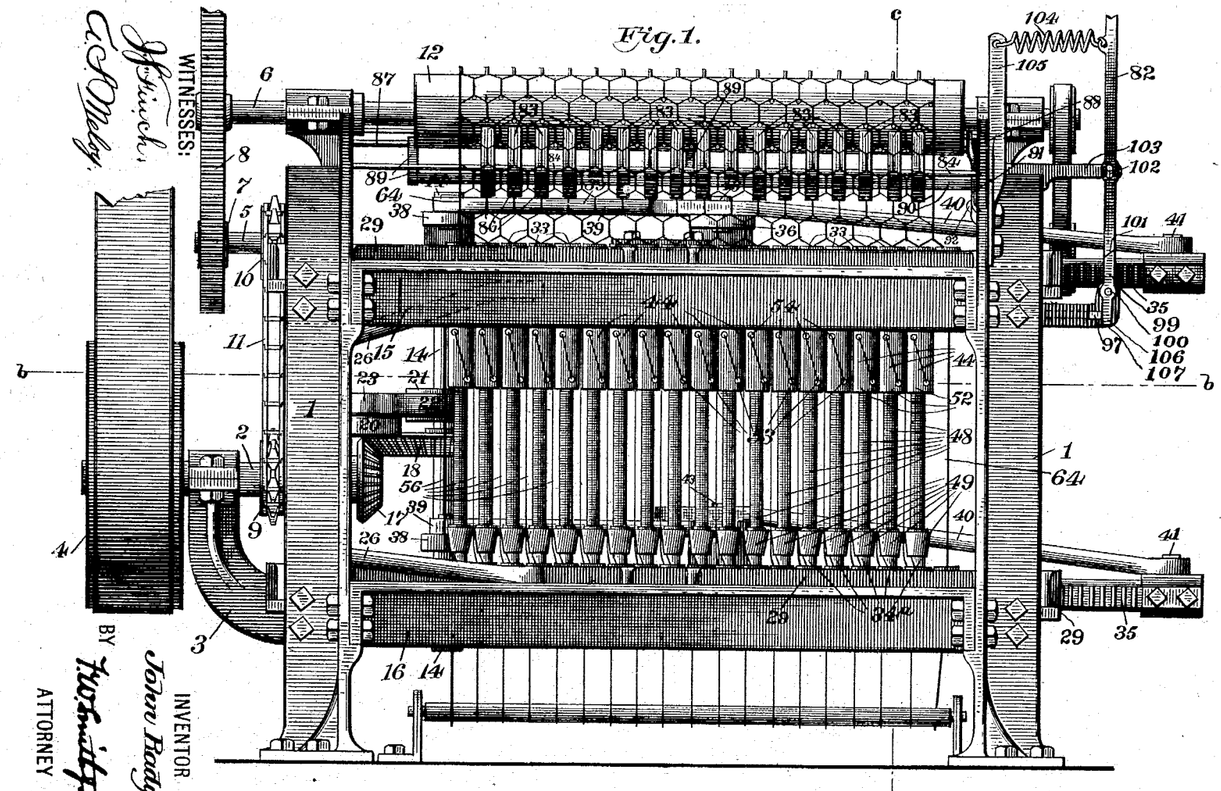
Figure 1 is a front elevation of my machine.

Referring to Figs. 1 and 5, 83 is a series of dogs held in normal position by the completed wire netting, and pivoted on a rod 84 whose ends are secured within the frame 1 of the machine. The forward ends 85 of these dogs are L-shaped and heavy enough to overbalance the heel-ends 86. 87 is a small shaft whose ends are loosely journaled in the frame 1 and 88 is a bell-crank rigidly mounted on said shaft. 89 is a series of arms also rigidly mounted on said shaft 87, and 90 is a flat rod which connects said bell-crank 88 and arms 89 rigidly together so that when motion is imparted to the shaft 87, the bell-crank, arms and flat connecting rod will all move in unison. 91 is a lever pivoted at 92 and loosely connected to the bell-crank 88 at 93. The forward end of the lever 91 is engaged by a wedge 94 on the slide 29 so that when the slide is reciprocated back and forth said wedge will cause the lever 91 to impart an oscillatory movement to the small shaft 87 and the parts carried thereby, as will be readily understood by reference to Figs. 5 and 14. The wedge 94 is secured within the slide 29 in any suitable manner and is supported by a very stiff spring 95. The spring 95 is of sufficient strength to keep the wedge 94 projected to cause the oscillation of the lever 91, bell-crank 88 and shaft 87 and parts carried thereby, but is also capable of being depressed for a purpose presently set forth. 96 is a tail extending from the wedge 94. 97 is a push-finger suitably guided in the frame 1 and having a toe 98. 99 is a dog pivoted at 100 and having a beveled nose 101 adapted to engage the similarly beveled end of the clutch-lever 82. Said clutch-lever 82 is loosely pivoted at 102 to a bracket 103 extending from the frame 1 so as to permit of a vertical sliding movement to said lever. 104 is a coil-spring one end whereof is secured to the lever 82 while the other end is secured to a bracket 105 projecting from the frame 1, the tendency of said spring being to retract said lever 82 and withdraw the clutch 81 from engagement with the power-pulley 80. The bevel-nosed dog 99 is limited in its movement by the abutment of the heel-end 106 against the shoulder 107 projecting from the frame 1.

The operation of the stop-motion devices above described is as follows: The reciprocating slide 29 carrying the wedge 94 causes the oscillation of the shaft 87 through the lever 91 and bell-crank 88. In this way the flat rod 90 secured to arms 89 and bell-crank 88 is caused to oscillate back and forth in close proximity to the heel ends of the dogs 83, which are held in normal position by the netting. Should one or more of either the woof or weft wires which form the netting become broken, there would be of course no mesh formed in the netting at the points throughout the same where said broken wires existed, and the forward ends of the respective dogs 83 at the points where no meshes were formed in the netting would drop by gravity and project their heel ends within the field of travel of the flat rod 90 carried by the oscillating shaft 87. This would prevent the oscillation of the shaft 87 and also through the bell-crank 88 stop any further movement of the lever 91. The lever 91 now being held as against any oscillatory movement the further reciprocation of the slide 29 will cause the wedge 94 to be depressed against the resiliency of the spring 95 and the tail 96 of said wedge will be projected beneath the lower surface of the slide to engage the toe 98 of the push-finger 97, and the continued movement of said slide 29 will cause the push-finger to operate upon the heel end of the dog 99 to release the clutch lever 82, and the coil-spring 104 will act upon said clutch lever to withdraw the clutch 81 from the power-pulley 80 and thus stop the machine.

Having described my invention, what I claim as new, and desire to secure by Letters Patent, is—

1. In a machine for making wire netting, the combination of the shaft 14 with the bevel gear mounted thereon and meshing with a bevel-gear on the drive-shaft 2, whereby rotary movement is imparted to said shaft 14, of the crank 38 mounted on said shaft 14, lever 36 pivoted on the frame and connected to the cranks 38 by pitman 39 and the connecting-rod 40 pivoted at one end to the rack-bar 35 for rotating the divided gears and having at the other end an elongated slot 42 within which extends the stud 43 on the lever 36, substantially as and for the purpose set forth.

2. In a machine for making wire netting, the combination of the shaft 14 with the bevel gear mounted thereon and meshing with a bevel-gear on the drive-shaft 2, of the eccentric 21 on the shaft 14, the lever 23 having in one end an elongated slot 24 and connecting said eccentric with the crank 20, the shaft 19 upon which said crank is secured, and the rocker-bar 25 and pitmen 26, and 27, whereby said rocker-bar is connected to the slides 28, and 29, substantially as and for the purpose set forth.

3. In a machine for making wire netting, the combination of the feed-roll 12, the sprocket-wheels 9, and 10, ovoidal in shape and eccentrically mounted on the shafts 2, and 5, and the sprocket chain 11, whereby a variable speed is imparted to said feed-roll, substantially as described.

4. In a machine for making wire netting, the combination of the upper and lower series of divided gears journaled within the reciprocatory slides, the bobbin-holders, the sections 32 of the upper series of divided gears having tails 34 which extend within recesses 47 in the heads of the bobbin-holders, and the sections 32$^a$ of the lower series of divided gears having tails 34$^a$ which extend within the annular recesses 50 in the blocks 49 on the spindles of the bobbin-holders, whereby said bobbin-holders are loosely journaled between the sections 32 and 32$^a$ of the upper and lower series of divided gears, substantially as set forth.

5. The combination of the divided gear sections 32 and 32$^a$, the bobbin-holder loosely journaled between said gear sections, the bobbin loose on the spindle 45 of the bobbin-holder, the hood 52 depending from the head of the bobbin holder and provided with perforations 53 and 54, the head 46 of the bobbin-holder having the perforation 61 communicating with a perforation 59 having a flared mouth in the divided gear section 32, whereby the wire may be drawn from the bobbin, substantially as and for the purpose set forth.

6. The combination of the bobbin-holder, the bobbin loose on the spindle 45 of said holder, the spindle squared at its lower end and having fitting thereon the block 49, said block having a series of depressions 63 adapted to be engaged by a teat 62 formed on the adjacent end of the bobbin, substantially as and for the purpose set forth.

7. The combination of the shaft 65 journaled in bracket 66, the disk 67 keyed on said shaft and carrying the spools of wire 70 for forming the selvage, said shaft 65 having in its end perforations 70$^a$ through which the wires from said spools 70 are threaded, means for rotating said shaft, and the gears 71, 72, and 73, for imparting a rotary movement to said spools 70, substantially as and for the purposes specified.

8. The combination of a device connected to the net forming mechanism so as to reciprocate in harmony therewith, a series of pivoted dogs whose noses are normally upheld by the wire netting and whose tails are below the field of action of said device, clutch mechanism capable of being connected with and disconnected from the power pulley, and appliances which operatively connect the net forming mechanism and clutch mechanism when the tails of the dogs are elevated to obstruct said device, substantially as set forth and described.

9. The combination of the shaft 87, the bell-crank 88 and arms 89 rigidly mounted thereon, the flat rod 90 secured to said arms and adapted to be oscillated back and forth in close proximity to the heel ends of the dogs 83, the lever 91 loosely connected to said bell-crank, and the reciprocatory slide 29 carrying the wedge, substantially as and for the purpose specified.

10. The combination of the lever 91 with means for holding said lever against oscillation when any of the wires which form the netting have become broken as described, of the wedge 94 adapted to be depressed to engage the toe of a push-finger 97, the bevel nosed dog 99 limited in its movement by the shoulder 107 projecting from the frame, and the clutch lever held in engagement with the power-pulley 80, substantially as described.

In testimony whereof I affix my signature in presence of two witnesses.

JOHN RADY.

Witnesses:
J. S. FINCH,
WALTER NICHOLS.